US007288233B2

(12) United States Patent
Breen et al.

(10) Patent No.: US 7,288,233 B2
(45) Date of Patent: Oct. 30, 2007

(54) DRY ADSORPTION OF OXIDIZED MERCURY IN FLUE GAS

(75) Inventors: Bernard P. Breen, Pittsburgh, PA (US); Robert A. Schrecengost, Beaver, PA (US); Stephen Niksa, Belmont, CA (US)

(73) Assignee: Breen Energy Solutions, Pittsburgh, PA (US)

( * ) Notice: Subject to any disclaimer, the term of this patent is extended or adjusted under 35 U.S.C. 154(b) by 443 days.

(21) Appl. No.: 10/910,035

(22) Filed: Aug. 3, 2004

(65) Prior Publication Data

US 2006/0029532 A1    Feb. 9, 2006

(51) Int. Cl.
*B01D 46/00*    (2006.01)
*B01D 53/64*    (2006.01)

(52) U.S. Cl. .................................. 423/210; 423/215.5
(58) Field of Classification Search ................ 423/210, 423/215.5
See application file for complete search history.

(56) References Cited

U.S. PATENT DOCUMENTS

| | | | |
|---|---|---|---|
| 4,273,747 A * | 6/1981 | Rasmussen | 423/210 |
| 6,136,281 A | 10/2000 | Meischen et al. | |
| 6,375,909 B1 * | 4/2002 | Dangtran et al. | 423/235 |
| 6,447,740 B1 | 9/2002 | Caldwell et al. | |
| 6,726,888 B2 | 4/2004 | Lanier et al. | |
| 6,942,840 B1 * | 9/2005 | Broderick | 423/101 |
| 2002/0114749 A1 | 8/2002 | Cole | |
| 2003/0147793 A1 | 8/2003 | Breen et al. | |
| 2003/0161771 A1 | 8/2003 | Oehr | |
| 2003/0185718 A1 | 10/2003 | Sellakumar | |
| 2004/0134396 A1 | 7/2004 | Lanier et al. | |
| 2006/0011115 A1 * | 1/2006 | Breen et al. | 110/345 |

FOREIGN PATENT DOCUMENTS

| EP | 0 860 197 A1 | 8/1998 |
|---|---|---|
| JP | 10180038 | 7/1998 |

OTHER PUBLICATIONS

"Kinetic Modeling of Homogeneous Mercury Oxidation: The Importance of NO and H2O in Predicting Oxidation in Coal-Derived Systems," S. Niksa, Joseph J. Helble and N. Fujiwara, Environmental Science and Technology, 2001.
"Chemical Reactions of Mercury in Compustion Flue Gases," Hall, et al. Water, Air and Soil Pollution, vol. 56, 1991, pp. 3-14.

* cited by examiner

*Primary Examiner*—Timothy C. Vanoy
(74) *Attorney, Agent, or Firm*—Buchanan Ingersoll & Rooney PC

(57) ABSTRACT

In a method of removing metals such as mercury from flue gas produced by combustion devices, water or water including a calcium-containing component or water including Cl⁻ anion formers or water including both a calcium-containing component and Cl⁻ anion formers is injected into the flue gas in a manner so that there are sufficient amounts of these materials in the flue gas when the flue gas is at a temperature from about 250° F. to about 350° F. to retain the mercury within the aqueous phase. After the water evaporates, the oxidized mercury is retained on the dry flyash particles present in the flue gas. These flyash particles bound with the oxidized mercury are removed from the flue gas by a particulate removal device, such as an electrostatic precipitator, baghouse filter or cyclone.

20 Claims, 2 Drawing Sheets

DRY ADSORPTION OF OXIDIZED MERCURY IN FLUE GAS

FIELD OF THE INVENTION

The present invention is directed toward the removal of mercury and other elemental metals from emissions from combustion devices and, more particularly, toward the removal of oxidized mercury from combustions devices.

BACKGROUND OF THE INVENTION

Much work has been done to remove pollutants from emissions from coal fired furnaces. The focus of most of these efforts has been toward the removal of particulates, nitrogen oxides ($NO_x$) and sulfur oxides ($SO_x$) from flue gas. Commercially available techniques for reducing $SO_x$ emissions in furnace flue gases include fuel switching, wet flue gas desulfurization (wet FGD or wet scrubbing), and dry flue gas desulfurization (dry FGD or dry scrubbing).

A significant number of coal fired furnaces switched to lower sulfur coal to avoid the expense of installing wet or dry FGD systems for $SO_x$ control. However, an equally significant number of coal fired furnaces have installed FGD, with wet FGD being far more common than dry FGD for $SO_x$ control.

The first wet scrubbers installed in the U.S. were combined particulate collectors and $SO_2$ adsorbers. However, the energy requirements for particulate collection proved to be excessive. Today, the most popular wet scrubber design is the spray tower.

Flue gas enters the side of the spray tower module at a temperature of 250° F. to 350° F. and is evaporatively cooled to approach its adiabatic saturation temperature by a slurry spray. Spray nozzles are used to control the mixing of the slurry with flue gas. Typically, large numbers of small nozzles are used to minimize flow maldistributions. The bottom of the spray tower contains a large tank called the reaction tank or the recirculation tank. The large volume of this tank provides sufficient residence time to allow the chemical and physical $SO_2$ retention processes to approach completion.

Most wet FGD scrubbers in the American utility industry operate with slurries of lime and magnesium salts or limestone. The slurries are atomized into fine sprays that maximize the interfacial area between flue gas and the aqueous phase to achieve typical $SO_2$ sorption efficiencies above 80%. Whereas these processes do not achieve the even higher sorption efficiencies predicted for thermochemical equilibrium of the sulfur-species, they do achieve the equilibrium retentions of oxidized mercury species when pH is maintained higher than 4.5. Such retentions have been found to vary from 60% to 99% of the oxidized mercury at the wet FGD inlet, depending on flue gas composition.

Dry scrubbing is the principal alternative to wet scrubbing for $SO_2$ control on utility boilers and is often used on units burning low sulfur coal. Dry FGD scrubbers operate with slurries of lime or calcium oxide that are also atomized into fine sprays and injected into flue gas. All the water is evaporated by the thermal energy of flue gas during sufficient residence time for $SO_2$ and other acid gases (HCl, $SO_3$) to react with hydrated lime, which forms a mixture of solid calcium compounds ($CaSO_3$, $CaSO_4$, $CaCl_2$). Since all the water is evaporated, the mixture of the ultimate reaction products is dry and amenable to particulate removal by electrostatic precipitators (ESPs), baghouse filters (BHFs), cyclones (CYCs), and other similar devices. Most of the oxidized and particulate mercury compounds in flue gas at the inlet to the dry FGD are also retained on the dry product mixture. Test data show that the retention of mercury in dry scrubbers increases in direct proportion to the sum of oxidized and particulate-mercury at the inlet, and therefore varies widely among different coal fired furnaces.

While the art has focused primarily on the removal of $NO_x$ and $SO_x$ from flue gases, there are also concerns about emissions of mercury and other elemental metals such as chromium, arsenic and lead from combustion devices. Mercury (Hg), the eightieth element, is an important pollutant which must be controlled. As a vapor it is a poison to the nervous system. It is the dire consequences of chronic mercury poisoning which gave birth to the term "Mad as a hatter." Hatters that used mercury to block the hats were exposed to toxic levels of mercury vapor. The tremors, shakes, stutters, and stammers common to mercury poisoning were endemic in the trade. Neither were astronomers, who frequently used telescopes which were floated on mercury, immune from this disease. It was at times fatal and has the characteristic of being cumulative over years of exposure, as the body's nervous system has difficulty in purging this element. Most industrial uses of mercury today are carefully controlled. The biggest anthropogenic sources of environmental mercury are coal combustion and the combustion of municipal solid waste. Coal, and especially municipal solid waste compositions, may also result in emissions containing chromium, arsenic and lead.

Mercury vapor is a poison. At the levels common in the atmosphere the concentrations are usually safe. However, mercury accumulates in lakes where it is further accumulated in fish. These fish, with organic mercury molecules in them, can be hazardous to individuals who eat them. Some states request and have posted warnings that people eat fish from some lakes no more frequently that once a week. Often it is stated that pregnant women and small children should eat no such fish.

Several states and the United States Environmental Protection Agency will soon limit the emissions of mercury and possibly other trace metals from combustion devices. A method for controlling emissions of mercury and other metals is therefore needed. Some control of mercury levels is possible by using particulate collection devices. However, only very expensive baghouses (fabric filters) are efficient enough to reduce the mercury to levels that may be required, and still it is possible for the elemental mercury vapor to escape as a gaseous vapor molecule.

Activated carbon and other fine particulates are used to absorb mercury. Special treatment of the activated carbon has been tested. However, collection by the use of activated carbon is very expensive. So, it is seen that a new method of removing mercury from flue gas is needed.

The present invention is directed toward overcoming one or more of the above-mentioned problems.

SUMMARY OF THE INVENTION

Mercury is emitted in power plant flue gases because the elemental form is almost completely insoluble in water and FGD scrubbing solutions. As such, the elemental mercury is either emitted as a vaporous gas, Hg(v), which is very difficult to separate or filter, or adsorbed onto flyash particulates and sorbents. If the mercury is oxidized it is $Hg^{2+}$, which readily dissolves in water and FGD scrubbing solutions. Moreover, the oxidized form of mercury dissolved in aqueous scrubbing solutions is retained in wastewater streams and on suspended FGD solids. Those streams are collected with routine handling procedures.

We have found that there are many forms of oxidized mercury in furnace flue gas, but mercury chloride ($HgCl_2$) is always the dominant form. Mercury chloride is extremely soluble in water, and therefore is mostly retained in wet FGD scrubbers rather than emitted. Retention of more than 90% of oxidized mercury in both the wet FGD aqueous phase and in scrubber solids has been demonstrated when the scrubber slurry pH is greater than 4.5. However, mercury retention rapidly decreases as scrubber slurry pH decreases below 4.5 and thus becomes more and more acidic. The availability of $Cl^-$ anions in the aqueous phase is also important for mercury retention, because aqueous compounds of mercury and chlorine retain the mercury in solution. Higher pH (above 4.5) and greater $Cl^-$ anion availability keeps the mercury in its oxidized form and retained in the aqueous phase instead of allowing the oxidized mercury to be released as $HgCl_2$ vapor or to revert to elemental mercury and be reemitted.

In dry in-duct mercury removal devices (MRDs) operated in accordance with the inventive method, a water spray is introduced into the flue gas to dissolve the oxidized mercury, while maintaining the flue gas above its dew point (water saturation temperature). In this so-called "dry adsorption" process, oxidized mercury first dissolves in water in the presence of a calcium (Ca)-sorbent. After the water evaporates, the mercury is retained on the dry sorbent. The calcium content of the flue gas is maintained at an appropriate level to control the pH and $Cl^-$ anion availability at levels that allow the aqueous phase to retain the oxidized mercury. The pH is controlled either by injecting a premixed slurry of water and basic compounds such as lime or limestone, or by relying on the wetting of inherent calcium (Ca)-minerals in flyash by an injected water spray if the levels of Ca-minerals in the flyash are adequate. The $Cl^-$ anion availability is controlled by co-injection of a $Cl^-$ containing compound with the water spray, if the HCl content of the flue gas is insufficient. All mercury retained in this manner after evaporation of the water on either the Ca-sorbents or the Ca-minerals in flyash can be removed from the flue gas at enhanced collection efficiencies by particulate collection devices such as electrostatic precipitators (ESPs), baghouse filters (BHFs), cyclones (CYCs), and other similar devices.

In order to ensure that the pH and $Cl^-$ anion availability are suitable for the retention of the oxidized mercury in the aqueous phase and that there is enough Ca-sorbent to subsequently adsorb the oxidized mercury after the water has evaporated, the flyash present in the flue gas or the flue gas itself is tested. Various methods may be utilized to test the flyash/flue gas.

In one form, a sample of the flyash present in the flue gas is taken from the furnace, and the HCl content of the flue gas is measured at the MRD inlet. The flyash is mixed with the specified amount of water for the spray, and the pH of the suspension is then measured to determine whether it is above an appropriate minimum level for the retention of oxidized mercury. If the pH of the flyash is measured at 4.5 or above, the flyash should contain enough calcium to allow the oxidized mercury to be retained in the aqueous phase, and only water need be injected into the flue gas. If the measured pH of the flyash is below 4.5, a slurry of water and a calcium-containing component will need to be injected into the flue gas in order to increase and maintain the pH level of the flyash at 4.5 or above to allow the oxidized mercury to first be retained in the aqueous phase then to be retained on the calcium as the water evaporates. Similarly, if the measured amount of HCl in the flue gas introduces an insufficient level of $Cl^-$ anion into the solution, then a compensatory amount of a water-soluble Cl-containing compound must be co-injected with the water spray.

Alternately, the amount of calcium in the flyash may also be measured to determine whether or not the flyash contains an appropriate amount of calcium to adsorb the oxidized mercury that is retained in the aqueous phase. If the measured calcium content in the flyash is below 5% by weight, then a slurry of water and a calcium-containing component will need to be injected into the flue gas to enable the oxidized mercury to be retained in the aqueous phase and then be adsorbed on the calcium as the water evaporates. If the calcium content of the flyash is 5% by weight or greater, adding water only should be sufficient to retain the oxidized mercury in the aqueous phase.

Flue gas also contains acid formers, such as HCl, $SO_2$ and $SO_3$. In some flue gas, the level of acid formers may be sufficiently high that they will counteract the beneficial effect of calcium that is present in the flue gas. Consequently, one may look at the level of acid formers in the flue gas as an indicator that a slurry of water and a calcium-containing component will need to be injected into the flue gas to enable the oxidized mercury to remain in the aqueous phase and then be adsorbed on the calcium as the water evaporates. The calcium-containing component may be any ingredient containing calcium, such as lime or limestone.

The temperature of the process is regulated by the amount of water sprayed into the flue gas. Heat losses should be minimized to achieve near-adiabatic operation at a temperature that approaches but is never cooler than the saturation temperature. More or less water spray is added to obtain the target temperature for variations in the inlet flue gas temperature and flue gas flow rate.

It is an object of the present invention to remove metals such as mercury from flue gas produced from combustion devices.

It is a further object of the present invention to remove metals such as mercury from flue gas produced from combustion devices such as furnaces, with minimal modification to such conventional furnaces.

Other objects, aspects and advantages of the present invention can be obtained from a study of the specification, the drawings, and the appended claims.

DETAILED DESCRIPTION OF THE INVENTION

Figure 1:
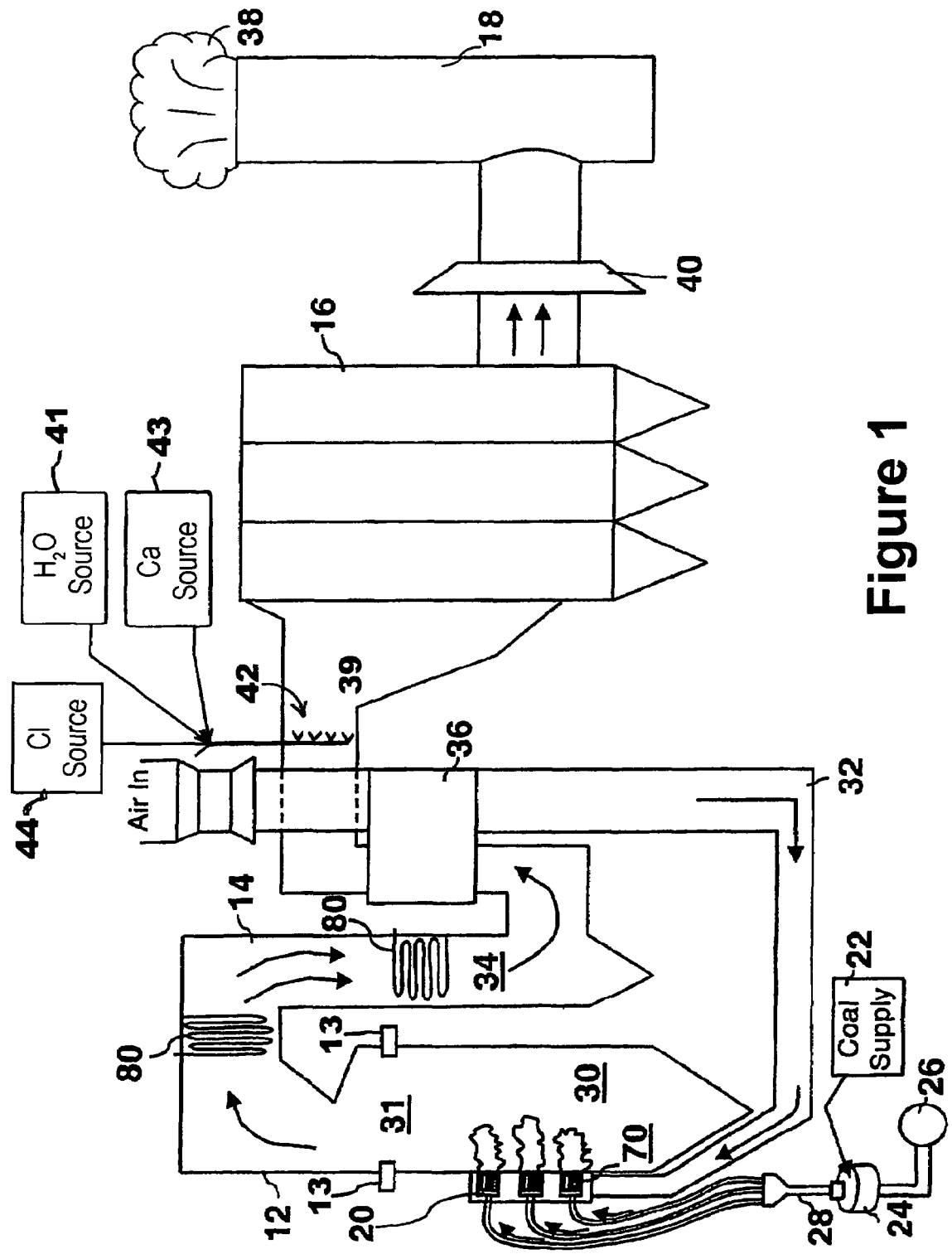
FIG. 1 is a diagram of a bottom fired furnace in which water is injected to control the emission of mercury in accordance with the present invention.

A conventional furnace 10, illustrated in FIG. 1, generally includes a boiler 12, an economizer 14, an electrostatic precipitator (ESP) 16 and a stack 18. The boiler 12 includes a plurality of burners 20 typically located on the front and/or rear walls of the boiler 12. For convenience, only three burners 20 are shown in FIG. 1.

Operation of the furnace 10 requires a supply of fuel to be burned, such as a coal supply 22. The coal supply 22 supplies coal at a predetermined rate to a pulverizer 24, which grinds the coal to a small size sufficient for burning. The pulverizer 24 receives a primary flow of air from a primary air source 26. Only one pulverizer 24 is shown in FIG. 1, but many are required for a large boiler, and each pulverizer 24 may supply coal to many burners 20. A stream of primary air and coal is carried out of the pulverizer 24 through line 28. The primary stream of air and coal in line 28 is fed to the burner 20, which burns the fuel/air mixture in a combustion zone 30, in which the temperature generally exceeds 1700K (2,600° F.).

To assist in the burning, the furnace 10 includes a secondary air duct 32 providing a secondary air flow through overfire air ports (not shown) to the burner 20. Usually about 20% of the air required for optimum burning conditions is supplied by the primary air source 26. The secondary air duct 32 is used to provide the remaining air. The secondary air duct 32 brings the excess air in from the outside via a fan (not shown), and the air is heated with an air preheater 36 prior to providing the air to the burner 20.

While only three burners 20 are shown in FIG. 1, it should be understood that there are typically many more burners spaced about the boiler 12 in a conventional furnace. Several burners 20 may share a secondary air windbox, and each burner 20 usually has an adjustable secondary air register 70 to control the air flow to it. Each of the burners 20 burns its respective fuel/air mixture in the combustion zone 30 of the boiler 12. As the plurality of burners 20 burn their respective fuel/air mixtures in the combustion zone 30, a gaseous by-product, typically known as flue gas, is produced. The gaseous by-product flows in the direction of the arrows through various temperature zones out of the boiler 12, through the economizer 14, through the ESP 16 and into the stack 18 where it is exhausted to the atmosphere at 38. A fan 40 aids the flow of the gaseous by-product in this manner. Various processing and testing procedures are performed on the flue gas as it flows from the boiler 12 through the various furnace elements and is exhausted by the stack 18. However, these procedures and tests are conventional in the art and descriptions thereof are not necessary. The flue gas is also used to heat steam and water in convective passes 80, as is known in the art.

While we have shown an opposed fired boiler 12 in FIG. 1, the inventive method works as well on various types of boilers, including, but not limited to, single face fired boilers, tangentially fired boilers, and cyclone fired boilers. While the opposed fired, single face fired, and tangentially fired boilers typically utilize a pulverized fuel, the cyclone fired boilers typically do not.

Usually, the flue gas will include particulates such as flyash, which normally is produced when coal is the fuel being burnt. The electrostatic precipitator 16, or other similar device, removes the flyash particles from the flue gas prior to the flue gas being exhausted to the atmosphere by the stack 18. The flyash produced from the combustion of the fuel/air mixture will typically include calcium. The amount of calcium present in the flyash will vary with the type of coal being burnt. The flue gas also contains HCl and other Cl-vapors that were released as such from the burning coal in the furnace. The flue gas also contains mercury released in the same way. Essentially all the mercury is present as elemental vapor at the furnace outlet. But some of the mercury will be converted to oxidized mercury and to mercury adsorbed onto particulates as the flue gases are cooled in the downstream components of the exhaust system.

After the flue gas flows through the convective passes 80, it enters a second temperature zone 34 where the temperature of the flue gas is reduced from about 1350° F. to about 800° F. to. When the flue gas reaches the third temperature zone 39 at the inlet of the electrostatic precipitator 16, it will generally be at a temperature of about 250° F. to about 350° F. The temperature zone 39 is that region between the air preheater 36 and the electrostatic precipitator 16 or other particulate collection device. We want to have water present in the temperature zone 39 where the flue gas is at a temperature of about 250° F. to 350° F. One way to accomplish this is to inject sufficient amounts of water from a water source 41 through spray nozzles, or injectors, 42 included in this temperature zone 39. One can also add a calcium-containing component, such as lime or limestone, from a calcium source 43 to the water to maintain the pH of the flyash in the flue gas at an optimum level as will be described hereafter. One can also supplement the Cl$^-$ anion availability in the spray water by co-injecting a water-soluble Cl-containing compound from a chlorine source 44. The source of Cl anions may be NaCl, KCl, $CaCl_2$, $MgCl_2$ or any other water soluble source of Cl$^-$ anions. Oxidized mercury present in the flue gas will be retained in water in the presence of calcium provided that sufficient Cl$^-$ anions are present to stabilize the mercury in solution. Thus, the amount of calcium present in the flyash and the availability of Cl$^-$ anions are factors to be considered when removing oxidized mercury in accordance with the present invention. The present invention is a dry adsorption process for mercury retention in furnace flue gas. While there are many forms of oxidized mercury in furnace flue gas, mercury chloride ($HgCl_2$) is always the dominant form. Mercury chloride is extremely soluble in water and, therefore, when water is injected into the flue gas in the temperature zone 39 via spray nozzles 42, the oxidized mercury present in the flue gas will dissolve in the aqueous phase. Stable aqueous chlorine compounds retain the oxidized mercury in the solution. After the water evaporates, the oxidized mercury is retained on dry particulates in the flue gas, where it is removed along with the dry particulates by the ESP 16 or other similar device.

In accordance with the inventive method, a water spray is introduced into the flue gas to dissolve the oxidized mercury while maintaining the flue gas above its dew point (water saturation temperature). In the inventive dry adsorption process, the oxidized mercury first dissolves in the water in the presence of a calcium (Ca)-sorbent. After the water evaporates, which also occurs within the temperature zone 39, the oxidized mercury is retained on the dry sorbent. In order to ensure that there is enough Ca-sorbent and available Cl$^-$ anion to retain the oxidized mercury, the flyash present in the flue gas and the flue gas composition are tested.

In accordance with the inventive method, a sample of the flyash present in the flue gas is taken from the furnace 10, then mixed with the specified amount of spray water. The pH of the flyash suspension is then measured to determine whether it is above an appropriate minimum level. If the pH of the flyash is measured at 4.5 or above, the flyash should contain enough calcium to allow the oxidized mercury to first be retained in the aqueous phase then be adsorbed on the calcium particles as the water evaporates, and only water need be added to the flue gas in order to adequately dissolve the oxidized mercury. If the measured pH of the flyash is below 4.5, a calcium-containing component should be added to the water in order to allow the oxidized mercury to first be retained in the aqueous phase then be adsorbed on the calcium particles as the water evaporates.

Alternately, the amount of calcium in the flyash may also be measured to determine whether or not the flyash contains an appropriate amount of calcium to control pH and allow the oxidized mercury to first dissolve in the aqueous phase then be adsorbed on the calcium particles as the water evaporates. If the measured calcium content in the flyash is below 5% by weight, then a calcium-containing component should be added with the water in order to allow the oxidized mercury to first be retained in the aqueous phase then be adsorbed on the calcium particles as the water evaporates. If the calcium content is 5% or greater, adding water only should be sufficient to retain the oxidized mercury. The calcium-containing component may be any ingredient containing calcium, such as lime or limestone.

Figure 2:
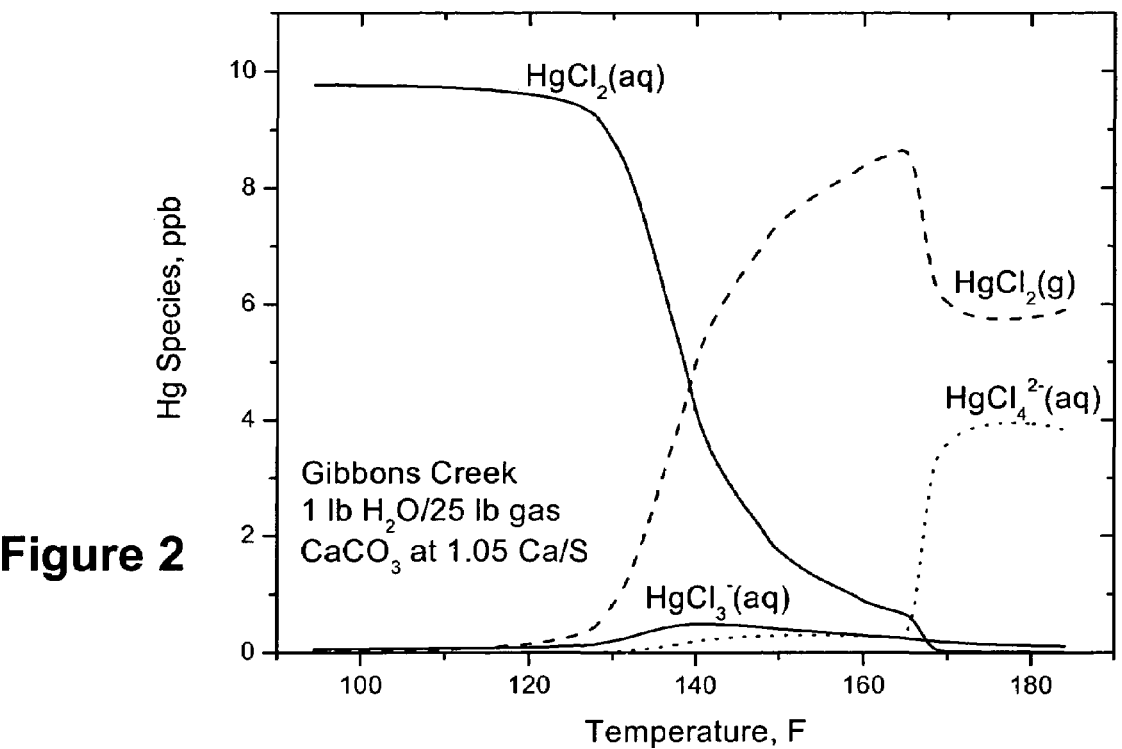
FIG. 2 is a diagram of the mercury species concentrations at equilibrium versus the operating temperature of the MRD for flue gas from a subbituminous coal.

In accordance with the inventive method, the amount of HCl in the flue gas is measured at the MRD inlet. Then this concentration is compared to a threshold value that satisfies the target Hg retention percentage, which generally differs for different fuel types. The calculated results in FIG. 2 show the distribution of mercury species at equilibrium versus MRD temperature for flue gases generated by combustion of a subbituminous coal. For these particular operating conditions, the bulk water phase vanished at about 133° F. At cooler temperatures essentially all the mercury was retained as $HgCl_2$(aq) within the bulk aqueous solution. At intermediate hotter temperatures, this $HgCl_2$(aq) was converted into $HgCl_3^-$(aq), $HgCl_4^{2-}$(aq), and $HgCl_2$ vapor. At still hotter temperatures, significant amounts of $HgCl_2$ vapor are retained in the condensed phase as $HgCl_4^{2-}$(aq).

Figure 3:
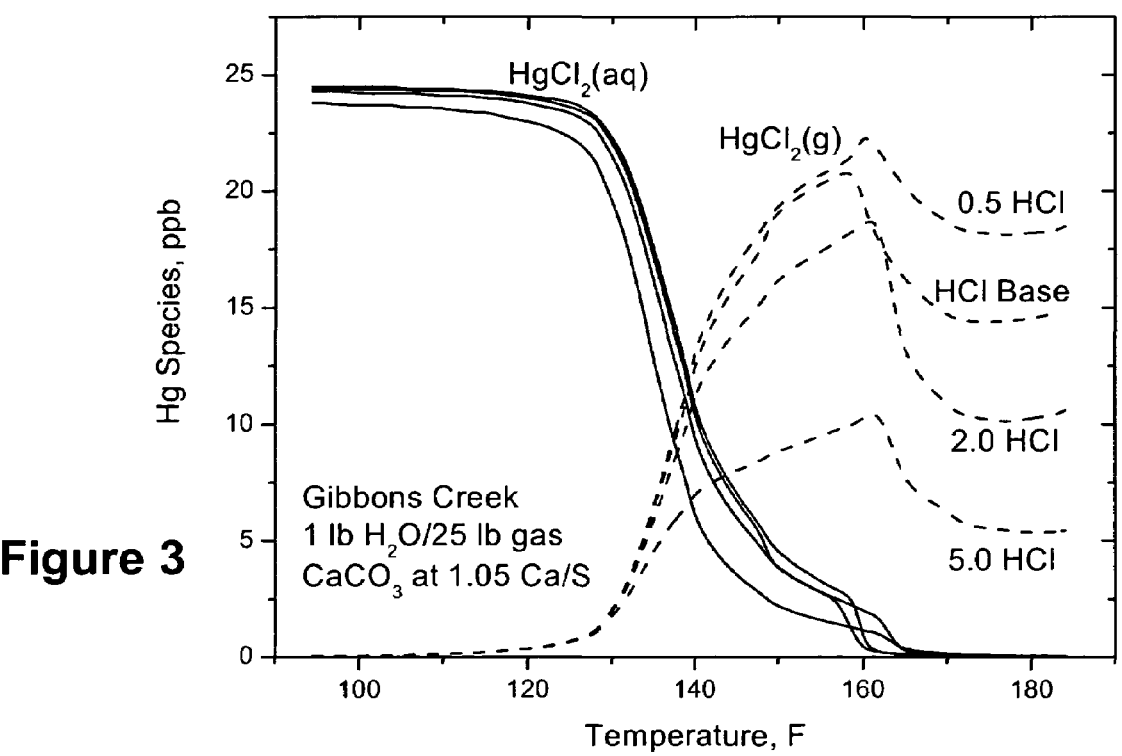
FIG. 3 is a diagram of the mercury species concentrations at equilibrium for various HCl additions versus the operating temperature of the MRD for flue gas from a subbituminous coal.

The equilibrium mercury species concentrations in FIG. 3 show that the release of $HgCl_2$ vapor may be controlled by increasing the availability of chlorine. In one case, the normal HCl level was halved, and the release of $HgCl_2$ above 160° F. was enhanced. Conversely, increasing the availability of HCl by factors of two or five reduced the emission of $HgCl_2$ vapor in proportion to the HCl enhancements. Hence, the inventive method includes an advisory to measure the HCl concentration at the MRD inlet, and to adjust the $Cl^-$ anion availability accordingly by co-injection of a water-soluble Cl-containing compound.

Regardless of the method used to determine the calcium content of the flyash and $Cl^-$ anion availability, conventional controls (not shown) will be utilized to control the flows of water, calcium sorbent, and $Cl^-$ anion formers from the water, calcium, and chlorine sources 41, 42 and 44, respectively, so that appropriate amounts of water and calcium, if necessary, and $Cl^-$ anions, in necessary, are injected into the flue gas via the nozzles 42.

Thus, the state of the aqueous phase within the temperature zone 39 is maintained at an appropriate level to allow the oxidized mercury to first be retained in the aqueous phase then to be adsorbed on the calcium particles as the water evaporates by injecting a premixed slurry of water and basic calcium-containing compounds, such as lime or limestone, and by co-injecting a water-soluble Cl-containing compound, if necessary, or by relying on the wetting of inherent Ca-minerals in the flyash by an injected water spray if the levels of Ca-minerals contained within the flyash are adequate. High Ca flyash is often characterized as producing a pH greater than 5.0 when mixed with water.

As the water evaporates within the temperature zone 39, the mercury is retained on the dry sorbent materials. All mercury retained in this manner on either the Ca-sorbents or the Ca-minerals in the flyash can be recovered from the flue gas at enhanced collection efficiencies by particulate collection devices such as electrostatic precipitators 16, baghouse filters, cyclones, and other similar devices. Typically, the present method operates to collect the mercury particles in less than one second, and usually within 200-400 milliseconds. The inventive method allows for the enhanced removal of oxidized mercury with minimal modification to a furnace. Basically, only the nozzles 42 need to be added to the furnace to inject the water or slurry of water and calcium into the flue gas to achieve the removal of oxidized mercury. Such ease of modification will allow the inventive mercury removal method to be incorporated into many furnaces.

The present invention allows the removal of oxidized mercury from a flue gas without the need for scrubbers, such as wet flue gas desulfurization (FGD) scrubbers, which are typically expensive. The dry adsorption process of the present invention achieves retention efficiencies for oxidized mercury compounds as high as those found in wet FGD scrubbers, without expensive liquid holding tanks and complicated processing trains, while adsorbing oxidized mercury vapors onto dry particulates that are effectively removed by existing particulate control devices. The dry adsorption process of the present invention enhances particulate collection efficiencies by cooling and humidifying suspensions before their particulates are collected. Thermal energy from the flue gas vaporizes away the aqueous phase, leaving mercury compounds adsorbed to dry solids. The compositions of the dry solids will change in proportion to the capture of $SO_2$, $SO_3$ and HCl. Such capture of these acid forming gases will be minimal because the dry adsorber maintains only the much shorter residence times required for the capture of oxidized mercury compounds, typically less than one second and generally within the range of 200-400 milliseconds.

Injected Ca-slurries or inherent Ca-compounds in the flyash maintain the pH of the aqueous phase above 4.5 while oxidized mercury compounds are retained in the aqueous phase. Sufficient $Cl^-$ anion availability is maintained by co-injecting a water-soluble Cl-containing compound whenever the natural HCl content of the flue gas is insufficient. Sufficient residence time for dissolution of oxidized mercury compounds is provided by regulating the atomization conditions in the spray injectors. The sizes of the atomized droplets in the spray can be adjusted to provide sufficient residence time for dissolution of the oxidized mercury in the aqueous phase prior to evaporation. It is well-known that vaporization times are extended in proportion to the square of the initial droplet diameter, and this knowledge enables atomizers to be adjusted to provide sufficient residence times for mercury retention, rather than for $SO_2$ capture. The spray injections 42 are also adjusted to promote coalescence of spray droplets with flyash particles whenever the flyash contains sufficient Ca-minerals to sustain the necessary pH.

While the present invention has been described with particular reference to the drawings, it should be understood that various modifications could be made without departing from the spirit and scope of the present invention.

We claim:

1. A method of removing mercury from flue gas produced by combustion devices burning mercury-containing fuel, the flue gas containing particles and passing from a combustion zone and through a particle removal device, the method comprising the step of introducing water into the flue gas prior to the particle removal device, the water being introduced in sufficient amounts to regulate the temperature at which the mercury is retained on the particles, taking a sample of the particles from the flue gas, mixing them with a selected amount of water spray, and measuring a pH level of the particle suspension.

2. A method of removing mercury from flue gas produced by combustion devices burning mercury-containing fuel, the flue gas containing particles and passing from a combustion zone and through a particle removal device, the method comprising the step of introducing water into the flue gas prior to the particle removal device, the water being introduced in sufficient amounts to regulate the temperature at which the mercury is retained on the particles, taking a sample of the particles from the flue gas and measuring a calcium content of the particles, wherein the water includes a calcium-containing component in an amount sufficient to maintain the calcium content of the particles at 5% by weight or above.

3. A method of removing mercury from flue gas produced by combustion devices burning mercury-containing fuel, the flue gas containing particles and passing from a combustion zone and through a particle removal device, the method comprising the step of introducing water into the flue gas prior to the particle removal device, the water being introduced in sufficient amounts to regulate the temperature at which the mercury is retained on the particles, taking a sample of the flue gas and measuring a content of HCl in the flue gas.

4. A method of removing mercury from flue gas produced by combustion devices burning mercury-containing fuel, the flue gas containing particles and passing from a combustion zone and through a particle removal device, the method comprising the steps of:
determining whether the particles include calcium in an amount sufficient to allow oxidized mercury to first be retained in an aqueous phase then to be adsorbed on the particles as the water evaporates;
determining whether the flue gas contains sufficient HCl to first retain oxidized mercury in an aqueous phase then to be adsorbed on the particles as the water evaporates;
if the particles include a sufficient amount of calcium and the flue gas contains sufficient Cl⁻ anion formers, introducing water into the flue gas prior to the particle removal device, the water being introduced in sufficient amounts to retain the oxidized mercury within the aqueous phase and to regulate the temperature of the process; and
if the particles include a sufficient amount of calcium but the flue gas does not contain sufficient Cl⁻ anion formers, co-injecting a water-soluble Cl-containing compound with water into the flue gas prior to the particle removal device, the water being introduced in sufficient amounts to retain the oxidized mercury within the aqueous phase and to regulate the temperature of the process; and
if the particles do not include a sufficient amount of calcium, introducing water including a calcium-containing component into the flue gas prior to the particle removal device, the water and calcium-containing component being introduced in sufficient amounts to allow the oxidized mercury to first be retained in the aqueous phase then be adsorbed on the calcium particles as the water evaporates.

5. The method of claim 4, wherein the steps of determining whether the particles include calcium in an amount sufficient to dissolve the mercury and introducing water or water and calcium into the flue gas comprise the steps of:
taking a sample of the particles from the flue gas;
suspending the flyash in a selected amount of water to form a particle suspension;
measuring a pH level of the particle suspension;
if the measured pH level of the particles is 4.5 or above, introducing water into the flue gas prior to the particle removal device, the water being introduced in sufficient amounts to retain the mercury within the solution; and
if the measured pH level of the particles is less than 4.5, introducing water including a calcium-containing component into the flue gas prior to the particle removal device, the water being introduced in sufficient amounts to retain the mercury within the solution, and the calcium-containing component being included in sufficient amounts to maintain pH of the particles at 4.5 or above.

6. The method of claim 4, wherein the steps of determining whether the particles include calcium in an amount sufficient to retain the mercury and introducing water or water and calcium into the flue gas comprise the steps of:
taking a sample of the particles from the flue gas;
measuring a calcium content of the particles;
if the measured calcium content of the particles is 5% by weight or above, introducing water into the flue gas prior to the particle removal device, the water being introduced in sufficient amounts to retain the mercury within the solution; and
if the measured calcium content of the particles is less than 5% by weight, introducing water including a calcium-containing component into the flue gas prior to the particle removal device, the water being introduced in sufficient amounts to retain the mercury within the solution, and the calcium-containing component being included in sufficient amounts to maintain the calcium content of the particles at 5% by weight or above.

7. The method of claim 4, wherein the mercury comprises oxidized mercury.

8. The method of claim 4, wherein the particles comprise flyash.

9. The method of claim 4, wherein the calcium-containing component comprises lime or limestone.

10. The method of claim 4, wherein the Cl⁻ anion former comprises any water-soluble Cl-containg compound.

11. The method of claim 4, wherein the water or the water including a calcium-containing component is added to the flue gas stream at a temperature zone prior to the particle removal device at which the temperature ranges for about 250° F. to about 350° F.

12. The method of claim 4, wherein the water or the water including a calcium-containing component is added to the flue gas stream so that the water evaporates prior to the flue gas entering the particle removal device.

13. A method of removing oxidized mercury from flue gas produced by combustion devices burning mercury-containing fuel, the flue gas containing flyash particles and passing from a combustion zone and through a particle removal device, the method comprising the steps of:
measuring a calcium content of the flyash particles; and
introducing water or a slurry of water and calcium-containing component into the flue gas prior to the particle removal device based on the measured calcium content of the flyash particles.

14. The method of claim 13, wherein the water or the slurry of water and a calcium-containing component is introduced into the flue gas stream at a temperature zone prior to the particle removal device at which the temperature ranges from about 250° F. to about 350° F.

15. The method of claim 14, wherein the water or the water including a calcium-containing component is added to the flue gas stream so that the water evaporates prior to the flue gas entering the particle removal device.

16. The method of claim 13, wherein the calcium-containing component comprises lime or limestone.

17. A method of removing oxidized mercury from flue gas produced by combustion devices burning mercury-containing fuel, the flue gas containing flyash particles and passing from a combustion zone and through a particle removal device, the method comprising the steps of:

measuring a content of $Cl^-$ anion formers in the flue gas; and introducing water or a slurry of water and calcium-containing component into the flue gas prior to the particle removal device based on the measured content of $Cl^-$ anion formers in the flue gas.

18. The method of claim 17, wherein the water or the slurry of water and a calcium-containing component is introduced into the flue gas stream at a temperature zone prior to the particle removal device at which the temperature ranges from about 250° F. to about 350° F.

19. The method of claim 18, wherein the water or the water including a calcium-containing component is added to the flue gas stream so that the water evaporates prior to the flue gas entering the particle removal device.

20. The method of claim 17, wherein the calcium-containing component comprises lime or limestone.

* * * * *

UNITED STATES PATENT AND TRADEMARK OFFICE
CERTIFICATE OF CORRECTION

PATENT NO. : 7,288,233 B2  Page 1 of 1
APPLICATION NO. : 10/910035
DATED : October 30, 2007
INVENTOR(S) : Bernard P. Breen, Robert A. Schrecengost and Stephen Niksa It is certified that error appears in the above-identified patent and that said Letters Patent is hereby corrected as shown below:

In Claim 17 at Column 11, line 14, after "and" insert --a--.

Signed and Sealed this

Twenty-seventh Day of May, 2008

JON W. DUDAS
*Director of the United States Patent and Trademark Office*